Patented Apr. 10, 1951

2,548,048

UNITED STATES PATENT OFFICE 2,548,048

ZINC PASTE

Charles Herbert Olsen, Stanmore, New South Wales, Australia, assignor, by mesne assignments, to The Sherwin-Williams Company, Cleveland, Ohio, a corporation of Ohio No Drawing. Application September 21, 1949, Serial No. 117,080. In Australia September 27, 1948

4 Claims. (Cl. 260—766)

This invention relates to an improved zinc paste and to a method of producing the same.

Hitherto zinc dust for paint has been employed in dry powder form, which is not convenient for handling or for direct incorporation with other ingredients of a paint composition and moreover the addition of the zinc dust to the other ingredients causes the evolution of hydrogen gas, which is undesirable (apart from unpleasantness and possible chance of explosion on ignition) because the pressure of the gas generated tends to blow the lids off the storage cans.

It is the object of my invention to overcome these difficulties and to make available a zinc product in a convenient paste form, easy to handle, ready for immediate incorporation into paint compositions of low acid value without causing the evolution of hydrogen therefrom and of good keeping properties.

In accordance with my invention an improved zinc product in paste form, suitable for incorporation into paint compositions, is prepared by intimately mixing together zinc in the form of dry dust or grindings and a depolymerised rubber varnish containing aluminium stearate.

Further features of my invention will be evident from the following description of one specific method of preparing my improved product, which is given by way of example.

One hundred pounds avoirdupois of dry zinc dust or grindings are intimately mixed with one and nine sixteenths gallons of a depolymerised rubber varnish (prepared as described below) containing one pound of aluminium stearate.

The mixing is carried out in a heavy duty mixing machine and is continued until the mass is homogeneous, which usually requires approximately half-an-hour. If desired the mass can then be passed through a suitable mill to effect a further reduction in the size of the zinc particles. If a pug mill or similar mill is employed the mixing and milling operations may be performed simultaneously.

To prepare the depolymerised rubber varnish fourteen pounds of crepe rubber is masticated with 0.35 pound of cobalt linoleate (containing 6–7% by weight of cobalt metal) for half an hour in a rubber mill having a roller heated until it is just warm to the touch. Alternatively half a pound of lead linoleate may be employed instead of the cobalt linoleate. This rubber product is then mixed with two gallons of a hydrocarbon solvent in a mixing machine having a tightly fitting closure until the mixture is homogeneous. The hydrocarbon solvent employed is preferably a mineral spirits having a distillation range of 130–210° C.

One pound of aluminium stearate is thoroughly mixed with one and nine-sixteenths gallons of this varnish before the latter is mixed with the zinc dust, as above described.

The zinc product is ready for immediate use, being already ground and in paste form. It is used by adding to it as required varnish, oil, pigments and other customary ingredients of paint compositions, thoroughly incorporating all together, until a paint composition of suitable brushing or spraying consistency for the intended use thereof is obtained.

The new zinc product will keep for several years in a condition ready for immediate use if it is stored in sealed containers, to prevent evaporation of solvent from the rubber varnish coating upon the zinc particles. Even if the product is kept in ordinary containers, without hermetic sealing, it will remain in good usable condition for several weeks under ordinary atmospheric conditions.

Mixing of this product with the other customary ingredients of paint compositions does not give rise to any significant evolution of hydrogen.

I claim:

1. An improved zinc product, suitable for immediate use by incorporation into paint compositions and which will keep in good condition for several years when stored in hermetically sealed containers comprising a smooth homogeneous paste consisting essentially of finely divided zinc particles which are coated with a thin layer of depolymerized rubber dissolved in a hydrocarbon solvent, said product being produced by intimately mixing together finely divided zinc in the proportions of about 100 lbs. of dry zinc with about $1\frac{9}{16}$ gallons of depolymerized rubber produced by masticating crepe rubber with about 2.5% by weight of a linoleate selected from the group consisting of cobalt and lead linoleates, dissolving said rubber product in an approximately equal amount by weight of a hydrocarbon solvent and adding thereto about 1 lb. of aluminum stearate.

2. An improved zinc product in accordance with claim 1 in which the hydrocarbon solvent is a mineral spirits having a distillation range of 130–210° C.

3. An improved zinc produce in accordance with claim 1 in which the finely divided zinc particles are in the form of dry zinc dust.

4. An improved zinc product in accordance with claim 1 in which the finely divided zinc particles are dry zinc grindings.

CHARLES HERBERT OLSEN.

REFERENCES CITED

The following references are of record in the file of this patent:

UNITED STATES PATENTS

| Number | Name | Date |
|---|---|---|
| 298,941 | Brown | May 20, 1884 |
| 1,482,340 | Acheson | Jan. 29, 1924 |
| 1,688,857 | Domoto | Oct. 23, 1928 |
| 1,863,834 | Coolidge | June 21, 1932 |
| 1,940,315 | McKay | Dec. 19, 1933 |
| 1,998,892 | Braden | Apr. 23, 1935 |
| 2,132,809 | Stevens et al. | Oct. 11, 1938 |